Patented Aug. 2, 1949

2,477,597

UNITED STATES PATENT OFFICE 2,477,597

PREPARATION OF 1,4-DICYANO-2-BUTENE

Glenn F. Hager, Wilmington, Del., assignor to E. I. du Pont de Nemours & Company, Wilmington, Del., a corporation of Delaware No Drawing. Application August 14, 1947,
Serial No. 768,703

5 Claims. (Cl. 260—465.8)

This invention relates to an improved process for preparing unsaturated nitriles. More particularly, it relates to a new process for preparing 1,4-dicyano-2-butene.

Preparation of 1,4-dicyano-2-butene has been proposed by reacting the corresponding dichloro or dibromobutene with an alkali or alkaline earth metal cyanide in aqueous or partly aqueous media. This method is disclosed in U. S. Patent 2,342,101. However, under the conditions described, the yields of 1,4-dicyano-2-butene were low, of the order of about 20%, and there was considerable formation of by-products, such as 1-cyano-1,3-butadiene.

It has recently been discovered that alkaline conditions in the cyanation of dihalobutenes are responsible for the relatively poor results of the prior art, and methods have been described (applications Ser. Nos. 696,356 and 696,357, filed September 11, 1946, by G. M. Whitman, now abandoned; see also application Ser. No. 745,236, filed May 1, 1947, by Tabet and Webb) wherein cyanation is carried out under non-alkaline conditions. However, the maintenance of non-alkaline conditions, particularly in aqueous systems, is sometimes difficult unless special precautions are observed.

It is an object of this invention to provide an improved method of preparing 1,4-dicyano-2-butene from dihalobutenes and alkali cyanides. A further object is to provide a method of preparing 1,4-dicyano-2-butene in high yields in aqueous systems permitting accurate control of acidity.

These objects are accomplished by the following invention which comprises reacting a dihalogen addition product of 1,3-butadiene, wherein the halogen atoms are of atomic weight between 35 and 80, with an alkali cyanide in an aqueous acidic reaction medium at a pH between 1 and 7, said medium containing a buffer in amount sufficient to serve as a pH regulating and controlling agent. In the preferred embodiment of the invention the reaction is carried out in the presence of a salt of copper as the catalyst.

It is known that addition of halogens, e. g. chlorine or bromine, to 1,3-butadiene gives a mixture of two isomeric dihalogen addition products, namely, 1,4-dihalo-2-butene and 3,4-dihalo-1-butene (see, for example, Muskat and Northrup in J. Am. Chem. Soc. 52, 4043, (1930)). In the process described here, either isomer, or their mixtures in any proportions, can be used to yield 1,4-dicyano-2-butene. Either the dichloro or the dibromobutenes can be used. The dichlorobutenes are cheaper and therefore preferred. In the description which follows, the term "dihalobutene" is sometimes used in the interest of brevity. It should be understood that the term refers to either the 1,4-dihalo-2-butenes or the 3,4-dihalo-1-butenes wherein the halogen is chlorine or bromine.

In strict accordance with accepted definitions, the term "buffer" as used here refers to a substance, or combination of substances, which when dissolved in water produces a solution which resists a change in its hydrogen ion concentration upon the addition of acid or alkali. A number of such pH regulating agents have been described in the chemical literature.

In the preferred practice of the invention, the dihalobutene and an aqueous solution of sodium cyanide are run with efficient stirring into water maintained at a temperature between 80 and 100° C. and at a pH between 1 and 7, and containing a catalytic amount of a copper salt and a buffer. The nature and amount of the buffer are such as to maintain the pH of the reaction mixture, after the reaction has started, within a narrow range whose extremes differ by less than 0.75 pH unit, this pH range lying preferably between 4 and 6.5. The reactants should be added at such a rate that the pH of the reaction mixture does not exceed 7, but, owing to the presence of the buffer, this condition is fulfilled even at a very rapid rate of addition. The reaction is stopped when the calculated amount, or a slight excess thereover, of the sodium cyanide has been added. The 1,4-dicyano-2-butene which has formed in nearly quantitative yield is isolated by appropriate means such as solvent extraction and distillation.

In addition to sodium cyanide, other alkali metal cyanides such as potassium or lithium cyanides, may be used. In order to utilize all of the dihalobutene, the alkali cyanide is preferably used in stoichiometrical amounts, i. e., two moles of cyanide per mole of dihalobutene. An excess of alkali cyanide of the order of 1 to 10% may be used to insure complete reaction, since the buffer prevents the development of alkalinity, provided the excess of alkali cyanide is small.

The dihalobutenes need not be employed in a high state of purity. For practical purposes it is possible to employ the crude mixture resulting from the halogenation, e. g., chlorination of 1,3-butadiene with no substantial sacrifice in the yield of 1,4-dicyano-2-butene.

Any standard buffer or buffer mixture giving aqueous solutions of pH between 1 and 7 may be used. Examples of such buffers are acetic acid-sodium acetate mixtures, potassium chloride-hydrochloric acid mixtures, potassium hydrogen phthalate and its mixtures with hydrochloric acid or sodium hydroxide, sodium dihydrogen phosphate, sodium citrate, and the like. The concentration of the buffer in the aqueous system depends upon the buffer's ability to accept hydroxyl ions while maintaining pH values below 7.0. In general, 5 to 25 mole per cent of the buffer based on the total alkali cyanide used is sufficient to give satisfactory pH regulating action. The optimum concentration with any given buffer, i. e., the molar quantity of buffer per mole of alkali cyanide to be desirably used, may be defined as that concentration which, in aqueous solution, will maintain the pH below 7.0 when 0.1 mole of sodium hydroxide is added. By way of illustration, optimum concentrations of the following buffers per mole of total alkali cyanide have been determined by means of the simple test described above:

Buffers suitable for use in pH range 4–7

Sodium dihydrogen phosphate, 0.125 mole
Acetic acid-sodium acetate, 0.102 mole of each
Sodium hydrogen phthalate, 0.115 mole

Buffers suitable for use in pH range 1–3

Sodium hydrogen sulfate, 0.100 mole
Hydrochloric acid-potassium chloride, 0.08 mole HCl-1.4 mole KCl The essential condition of maintaining the reaction mixture at all times at a pH from 1 to 7 depends on a controlled rate of addition of the reactants, particularly the alkali cyanide. The great advantage resulting from the use of a buffer lies in the fact that the reactants can be brought in contact much more rapidly, and with less regard for relative proportions, than in the absence of a buffer. Preferably, the pH of the reaction mixture is maintained at some value between 4 and 6.5.

The reaction will proceed without catalyst with either the 1,4-dihalo-2-butenes or the 3,4-dihalo-1-butenes but it is then very slow. Practical reaction rates are achieved through the use of copper salts which act as catalysts. Either cuprous or cupric compounds may be used, examples of suitable salts being cuprous chloride, cupric chloride, cuprous bromide, cupric fluoride, cupric sulfate, cupric nitrate, cuprous cyanide, cupric acetate, and copper acetylacetonate. There may also be used complex copper salts such as cuprous chloride-potassium chloride or cuprous chloride-ammonium chloride complexes. Metallic copper itself may be used since it becomes solubilized in the acidic aqueous system. The catalyst is suitably used in amounts between 0.1% and 10% based on the dihalobutene, a preferred proportion being between 0.5% and 3%.

The amount of water present is not critical. It need only be sufficient to prevent excessive precipitation of the alkali halide which forms during the reaction. Preferably, the water is used in proportions relative to the dihalobutene ranging from 1:1 to 10:1. If desired, the water may contain minor proportions of organic solvents. It may also contain surface-active agents to facilitate the contact between the dihalobutene and the alkali cyanide.

The reaction is extremely slow at low temperature, e. g. about 20° C. To achieve a practical reaction rate a minimum temperature of about 40° C. is desirable, the preferred temperature range being 80–100° C. If desired, the reaction can be carried out at higher temperatures, e. g. up to 150° C., in closed vessels. The reaction is preferably carried out at atmospheric pressure, although higher or lower pressure may be used if desired.

The resulting 1,4-dicyano-2-butene may be isolated by any suitable method such as direct distillation or steam distillation from the reaction mixture, or crystallization directly from the mixture on cooling, or solvent extraction followed by crystallization or distillation. In large scale runs where the reaction time is relatively long, there is usually formed also a minor proportion of the isomeric, liquid dinitrile, 1,4-dicyano-1-butene. The two isomers can be separated by distillation or crystallization if desired, but this is in general unnecessary.

The process is illustrated in detail in the following examples in which parts are by weight.

Example I

A reaction vessel fitted with an efficient agitator, a liquid charging device, thermometer, reflux condenser, and a glass electrode system for measuring the pH of aqueous solutions is charged with a solution of 1.58 parts of cupric chloride ($CuCl_2.2H_2O$) and 17.25 parts (one-eighth mole) of monobasic sodium phosphate ($NaH_2PO_4.H_2O$) in 75 parts of distilled water. To the solution heated to 80° C. is added 62.5 parts of 1,4-dichloro-2-butene and the mixture is heated to 94° C. To the stirred mixture is added gradually in the course of 35 minutes 131 parts by volume of a solution prepared by dissolving 56 parts of 95% sodium cyanide in 110 parts of water. The quantity of sodium cyanide added corresponds to a slight excess over the theoretical amount required to react with the dichlorobutene. The reaction is exothermic and intermittent cooling is required to keep the temperature between 94 and 100° C. Throughout the reaction the pH of the mixture is within the narrow range 5.0 to 5.5. After completion of the reaction the mixture is cooled to 60° C. and treated with 300 parts of chloroform. The chloroform layer is separated, the aqueous portion is extracted with an additional 450 parts of chloroform and the combined chloroform extracts are dried over anhydrous calcium sulfate. Distillation gives 1.4 parts of low boiling foreshot and 47.3 parts (89.3% yield) of 1,4-dicyano-2-butene, boiling at 96° C. at 0.4 mm. pressure and melting at 75–76° C.

Example II

A reaction vessel equipped as described in Example 1 is charged with a solution of 1.58 parts of cupric chloride ($CuCl_2.2H_2O$) and 17.25 parts (one-eighth mole) of sodium bisulfate ($NaHSO_4.H_2O$)

in 75 parts of water. This solution is heated to 80° C. and 62.5 parts of 1,4-dichloro-2-butene is added. The initial pH of the reaction mixture is 3.05. One hundred and twenty-eight parts by volume of a solution prepared by dissolving 56 parts of 95% sodium cyanide in 110 parts of water is added gradually to the stirred mixture in the course of 35 minutes, during which addition the temperature varies between 90 and 97° C. The pH goes up to 5.25 upon addition of about 7% of the sodium cyanide solution and remains throughout in the range 5.05–5.65. After completion of the reaction the mixture is cooled to 60° C. and worked up as in Example 1. The yield of 1,4-dicyano-2-butene is 47.7 parts or 90% of the theory.

When the reaction is repeated under identical conditions except that 3,4-dichloro-1-butene is used in place of 1,4-dichloro-2-butene, the yield of 1,4-dicyano-2-butene is substantially the same (89.4%). The pH of the reaction mixture remains within the range 5.50–6.0. The reaction rate is somewhat slower.

*Example III*

A reaction vessel fitted with an efficient agitator, two liquid charging devices, thermometer, reflux condenser and a glass electrode system for measuring the pH of the aqueous reaction mixture is charged with a solution of 46 parts of cupric sulfate pentahydrate ($CuSO_4.5H_2O$), 2700 parts of distilled water, 288 parts of 85% phosphoric acid and 62 parts of sodium hydroxide. The initial pH of this mixture is 2.0. The mixture is heated to 100° C. and there is added simultaneously with stirring (a) a solution of 2040 parts of 95% sodium cyanide in 4000 parts of distilled water and (b) 2865 parts of a crude dichlorobutene containing 2500 parts of 1,4-dichloro-2-butene, the remainder being 1,2,3-trichloro-butane which is formed during the chlorination of butadiene and is difficult to separate from 1,4-dichloro-2-butene. The pH of the mixture rises rapidly to 4.8 and the rate of addition of the reactants is controlled so that it remains in the range between 4.8 and 5.4. After completion of the addition, which requires approximately two hours, the mixture is cooled to 15° C. and the crystalline 1,4-dicyano-2-butene which separates is filtered off, washed with 1500 parts of distilled water, then with 500 parts of cold ether. The dry material amounts to 1621 parts. Extraction of the aqueous filtrate with 3000 parts of chloroform followed by distillation of the extract gives 345 parts of 1,2,3-trichloro-butane, 150 parts of 1,4-dicyano-1-butene (mixture of cis and trans isomers) and 171 parts of 1,4-dicyano-2-butene. The total yield of dicyanobutenes is 1942 parts, or 91.5% of the theory. It is in general unnecessary to separate the isomeric dicyanobutenes, particularly if the product is to be used to prepare hexamethylenediamine by catalytic hydrogenation.

When, in the above described experiment, the phosphoric acid-sodium hydroxide buffer is replaced by a mixture of 315 parts of acetic acid and 408 parts of sodium acetate trihydrate, all other conditions being substantially identical, the initial pH of the mixture is 4.5 and there is no difficulty in controlling the pH during the reaction. In this case, however, a certain proportion of the dichlorobutene is converted to the corresponding diacetate, so that the yield in dicyanobutene is only 78%. Under the same conditions, a sodium hydrogen phthalate buffer prepared from 250 parts of phthalic anhydride and 30 parts of sodium hydroxide gives a reaction mixture of initial pH 2.0. The yield of dicyanobutene is 85.7%

The above examples illustrate the preferred procedure for carrying out the reaction. Other modes of operation may be used, however. For example, the alkali cyanide solution may be introduced or injected at several points in the reaction vessel to facilitate mixing, or solid alkali cyanide may be used in place of an aqueous solution. It is in general desirable in large scale runs to introduce the dihalobutene and the alkali cyanide simultaneously in the reaction mixture, since control of the pH is easier when this procedure is followed. However, the alkali cyanide may be added to a mixture of the aqueous phase with part or all of the dihalobutene. The reaction may be carried out in an inert atmosphere, but this is by no means essential. These and other variations will not affect the results provided that the essential condition, which is an acidic reaction medium, is maintained throughout the reaction.

1,4-dicyano-2-butene is of great interest as an intermediate and starting material for intermediates in many syntheses for example through conversion to dihydromuconic acid by hydrolysis or to hexamethylenediamine by reduction. The latter compound is one of the principal ingredients of the polyamides generically designated as nylon.

As many apparently widely different embodiments of this invention may be made without departing from the spirit and scope thereof, it is to be understood that this invention is not limited to the specific embodiments thereof except as defined in the appended claims.

I claim:

1. A method for preparing 1,4-dicyano-2-butene which comprises reacting a dihalogen addition product of 1,3-butadiene wherein the halogen atoms are of atomic weight between 35 and 80, with an alkali cyanide in an aqueous acidic reaction medium at a pH between 1 and 7, said medium containing a buffer in amount sufficient to serve as a pH regulating and controlling agent.

2. A method for preparing 1,4-dicyano-2-butene which comprises reacting a dihalogen addition product of 1,3-butadiene wherein the halogen atoms are of atomic weight between 35 and 80, with sodium cyanide in an aqueous acidic reaction medium at a pH between 1 and 7, said medium containing a copper salt catalyst and a buffer in amount sufficient to serve as a pH regulating and controlling agent.

3. A method for preparing 1,4-dicyano-2-butene which comprises maintaining at a temperature between 40° C. and 150° C. an aqueous acidic reaction medium at a pH between 1 and 7, said medium containing a buffer in amount sufficient to serve as a pH regulating and controlling agent, and introducing sodium cyanide during the reaction into said reaction medium and in contact therein with a dichloro addition product of 1,3-butadiene.

4. A method for preparing 1,4-dicyano-2-butene which comprises maintaining at a temperature between 80° C. and 100° C. under atmospheric pressure an aqueous acidic reaction medium at a pH between 4 and 6.5, said medium containing a copper salt catalyst and a buffer in amount sufficient to serve as a pH regulating and controlling agent, and introducing sodium cyanide during the reaction into said reaction medium and in contact therein with a dichloro addition product of 1,3-butadiene.

5. A method for preparing 1,4-dicyano-2-butene which comprises maintaining at a temperature between 80° C. and 100° C. under atmospheric pressure an aqueous acidic reaction medium at a pH between 4 and 6.5, said medium containing a copper salt catalyst and a buffer in amount sufficient to serve as a pH regulating and controlling agent, and introducing sodium cyanide and 1,4-dichloro-2-butene during the reaction into said reaction medium.

GLENN F. HAGER.

REFERENCES CITED

The following references are of record in the file of this patent:

UNITED STATES PATENTS

| Number | Name | Date |
|---|---|---|
| 1,672,253 | Giles | June 5, 1928 |
| 2,097,155 | Groll et al. | Oct. 26, 1937 |
| 2,242,084 | Nicodemus | May 13, 1941 |
| 2,342,101 | Cass et al. | Feb. 22, 1944 |
| 2,415,261 | Rogers | Feb. 4, 1947 |

FOREIGN PATENTS

| Number | Country | Date |
|---|---|---|
| 708,111 | France | July 20, 1931 |

OTHER REFERENCES

Breckpot, Bull. Soc. Chim. Belg., vol. 39, pages 462–479 (1930).